United States Patent [19]

Clokie

[11] Patent Number: 5,272,380
[45] Date of Patent: Dec. 21, 1993

[54] ELECTRICAL SUPPLY CONTROL SYSTEM FOR A MOTOR VEHICLE

[75] Inventor: Andrew K. Clokie, Coventry, United Kingdom

[73] Assignee: Jaguar Cars Limited, United Kingdom

[21] Appl. No.: 663,863
[22] PCT Filed: Sep. 4, 1989
[86] PCT No.: PCT/GB89/01034
§ 371 Date: Mar. 8, 1991
§ 102(e) Date: Mar. 8, 1991
[87] PCT Pub. No.: WO90/02670
PCT Pub. Date: Mar. 22, 1990

[30] Foreign Application Priority Data

Sep. 9, 1988 [GB] United Kingdom ............... 8821167

[51] Int. Cl.⁵ .................. H02H 7/18; H02J 7/00
[52] U.S. Cl. .................. 307/10.7; 320/33; 324/433
[58] Field of Search .......... 307/9.1, 10.1, 10.7, 307/39, 130; 340/455, 457, 438, 636; 320/13, 33, 48; 455/343, 345; 361/92; 324/433

[56] References Cited

U.S. PATENT DOCUMENTS

| | | | |
|---|---|---|---|
| 3,395,288 | 7/1968 | Von Brimer | 307/10.7 |
| 3,522,481 | 8/1970 | Terzic | 361/92 |
| 3,852,732 | 12/1974 | Yorksie et al. | 340/636 |
| 4,080,560 | 3/1978 | Abert | 340/636 |
| 4,493,001 | 1/1985 | Sheldrake | 361/92 |

Primary Examiner—A. D. Pellinen
Assistant Examiner—Richard Elms
Attorney, Agent, or Firm—Davis, Bujold & Streck

[57] ABSTRACT

A typical motor vehicle has an electrical storage battery (BT) to power its electrical facilities (L), including facilities which normally consume current when the vehicle is left unattended. A control system (CU) for the electrical supply system comprises means for generating a first relatively low reference voltage (VR1) and a second relatively high reference voltage (VR2), each selected to conform to a pre-selected battery condition; a first timing means (T1) operable for a relatively short period and a second timing means (T2) operable for a relatively long period. The timers operate from the time when the driver leaves the vehicle. A first voltage comparator (C1) is arranged to compare the actual battery voltage with the first reference voltage after said relatively short period and thereafter to provide a low battery signal if the actual voltage is below the first reference voltage. Similarly a second voltage comparator (C2) is arranged to compare actual battery voltage with the second reference voltage after said relatively long period and thereafter to provide a low battery signal if the actual voltage is below the first reference voltage. The battery is isolated from the electrical system (at master switch MS) in response to either low battery signal to preserve some battery charge and is reconnected by the driver on return to the vehicle, for example in response operation of an ignition switch (IS).

13 Claims, 2 Drawing Sheets

ELECTRICAL SUPPLY CONTROL SYSTEM FOR A MOTOR VEHICLE

The invention relates to electrical supply control systems for motor vehicles and is concerned particularly with safeguarding an electrical storage battery in a vehicle from excessive discharge.

There is an increasing tendency to equip motor vehicles with electrically operated facilities which take power from the vehicle battery with the vehicle unattended. Typical examples are memories for preferred positions of electrically adjustable devices such as seats and mirrors and memories for radio tuning. Other examples are clocks and alarm systems. In addition to these facilities which can not normally be isolated from the electrical supply under the control of a driver, other electrical facilities may be left on accidentally when a vehicle is unattended or fail to a condition where they draw current inadvertently.

As a result of this drain on the battery, a battery which is in poor condition or which has a low state of charge may become discharged when the vehicle is left for a few hours to such an extent that the battery is unable to start the engine. In a typical installation with a nominal 12 volt battery, the normal quiescent battery potential is approximately 12.7 volts. The battery is unlikely to be able to start the vehicle engine in favourable conditions at voltages below 10.5 volts, but in adverse conditions such as low temperatures this minimum voltage may rise to 11.5 or even 11.75 volts.

Another problem which can arise even with a well charged battery in good condition if it is left for several days is that the battery can become discharged to the level where the battery deteriorates significantly by sulphation.

SUMMARY OF THE INVENTION

An object of the present invention is to provide a control system for the electrical supply of a motor vehicle which reduces the risk of excessive battery discharge.

In accordance with the present invention there is provided a control system for the electrical supply of a motor vehicle, the motor vehicle incorporating an electrical storage battery and electrical system including at least one facility which normally consumes current when the vehicle is left unattended and driver operable facilities such that a first switching operation normally occurs when the driver leaves the vehicle and a second switching operation normally occurs when the driver returns to the vehicle; the control system comprising means for generating a first relatively low reference voltage and a second relatively high reference voltage, each selected to conform to a pre-selected battery condition; a first timing means operable for a relatively short period and a second timing means operable for a relatively long period; means responsive to said first switching operation to start the timers, first voltage comparison means arranged to compare the actual battery voltage with the first reference voltage after said relatively short period and thereafter to provide a low battery signal if the actual voltage is below the first reference voltage; second voltage comparison means arranged to compare actual battery voltage with the second reference voltage after said relatively long period and thereafter to provide a low battery signal if the actual voltage is below the second reference voltage; means for isolating the battery from the electrical system in response to either low battery signal and means for reconnecting the battery to the electrical system in response to said second switching operation.

With such an arrangement, electrical units such as memory devices remain effective when the vehicle is left standing provided that the battery is in an appropriate condition. If battery voltage drops to a predetermined level selected as the limit of acceptability, the battery is isolated from its loads with a view to preventing further discharge. By providing two different reference battery voltage levels at which the battery may be isolated and making these reference voltages effective after different time delays the system can be set so that good battery protection is provided in conjunction with a reduced risk of unnecessary battery isolation.

Preferably the driver operable switch means is the ignition switch in which case the driver simply operates the vehicle normally regardless of whether the control system has been triggered. Alternatively the driver operable switch means may be coupled to a door lock or operated by a remote controller.

The means for isolating the battery from the electrical system may be a memory relay which remains in an open state without any electrical supply. It may also be such as to remain closed without any electrical supply although a small current for holding it closed may be acceptable. The relay should be openable by and remain open in response to a finite pulse generated when low battery voltage is detected. Closure of the driver operable switch means should override all other influences on the relay and hold it closed.

Instead of a memory relay the means for isolating the battery may be a solid-state device, for example a number of field effect transistors in parallel. The number should be chosen to provide the required current capacity. The first timing means may be such as to render the control system operative only after the vehicle has been left unattended for sufficient time for the battery voltage to stabilise. A typical period might be from five to thirty minutes. Such a timer may be associated with a reference voltage near the voltage limit at which the battery can start the engine, typically between 11.5 volts and 11.75 volts.

The second timing means may be operable for a period of between thirty-six hours and four days and the associated second reference voltage may be about 12.2 volts.

The control system may also comprise third and fourth timers responsive to the respective voltage comparison means to permit isolating of the battery only after the comparison means indicates that the battery voltage has been below the respective reference voltage for a preset time dependent on the third or fourth timer.

An embodiment of the invention will now be described with reference to the accompanying drawings in which:

DESCRIPTION OF PREFERRED EMBODIMENT

Figure 1:
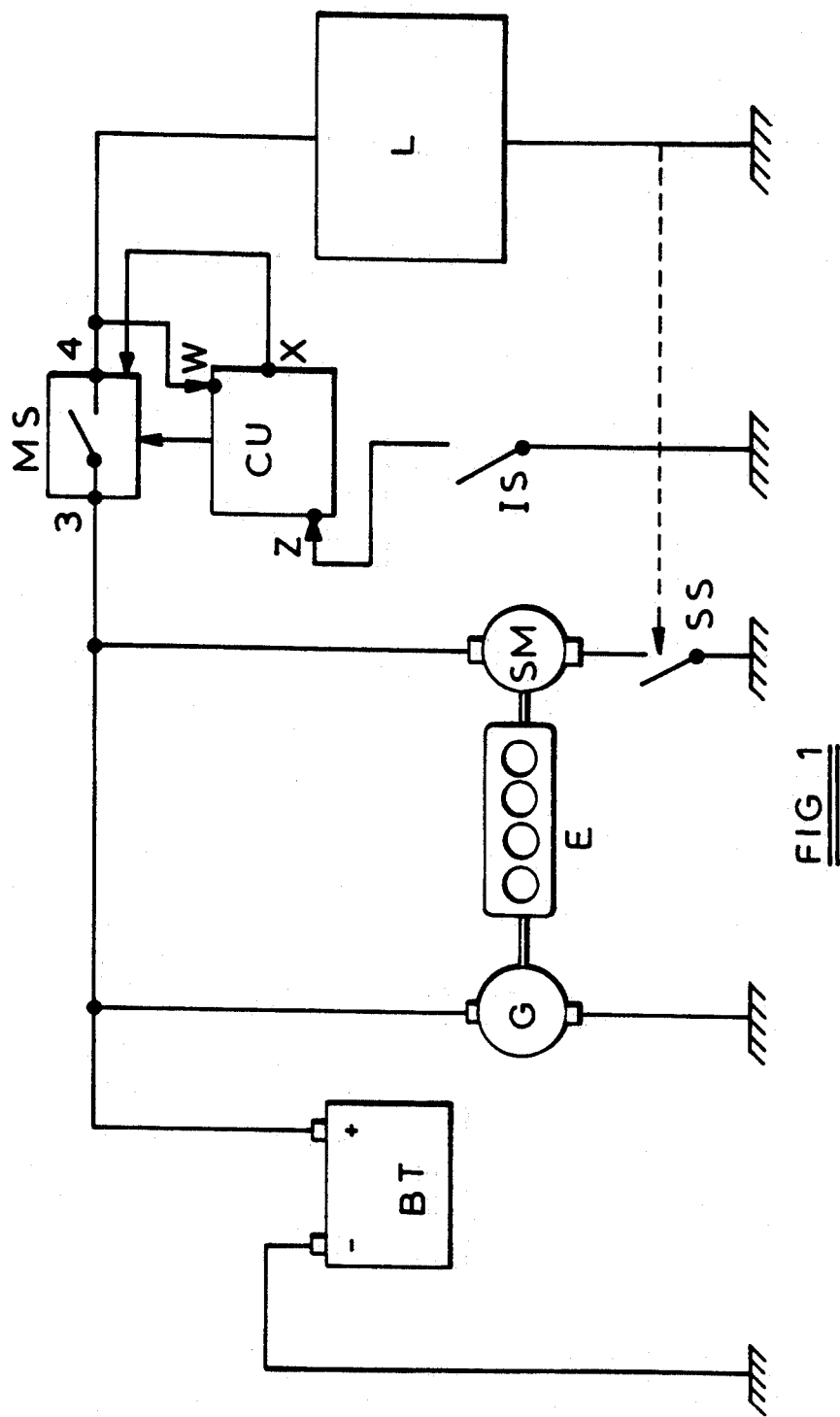
FIG. 1 is a diagramatic representation of the electrical system of a motor car incorporating the present invention.

FIG. 1 shows diagramatically the fundamental parts of the electrical system for a motor car. A conventional battery BT has its negative terminal connected to vehicle ground and its positive terminal connected to a variety of vehicle loads represented by the block L through a normally closed master switch MS. A generator G driven by an internal combustion engine E is arranged to recharge the battery when necessary and also to supply power to the loads when the engine is running. A starter motor SM for the engine E is connected to the battery positive terminal before the master switch MS so that the master switch does not at any time have to carry the very heavy starter current required for engine starting. However, control for the starter motor by switch SS requires an electrical signal produced within load L so the starter motor will not operate if master switch MS is open.

Figure 2:
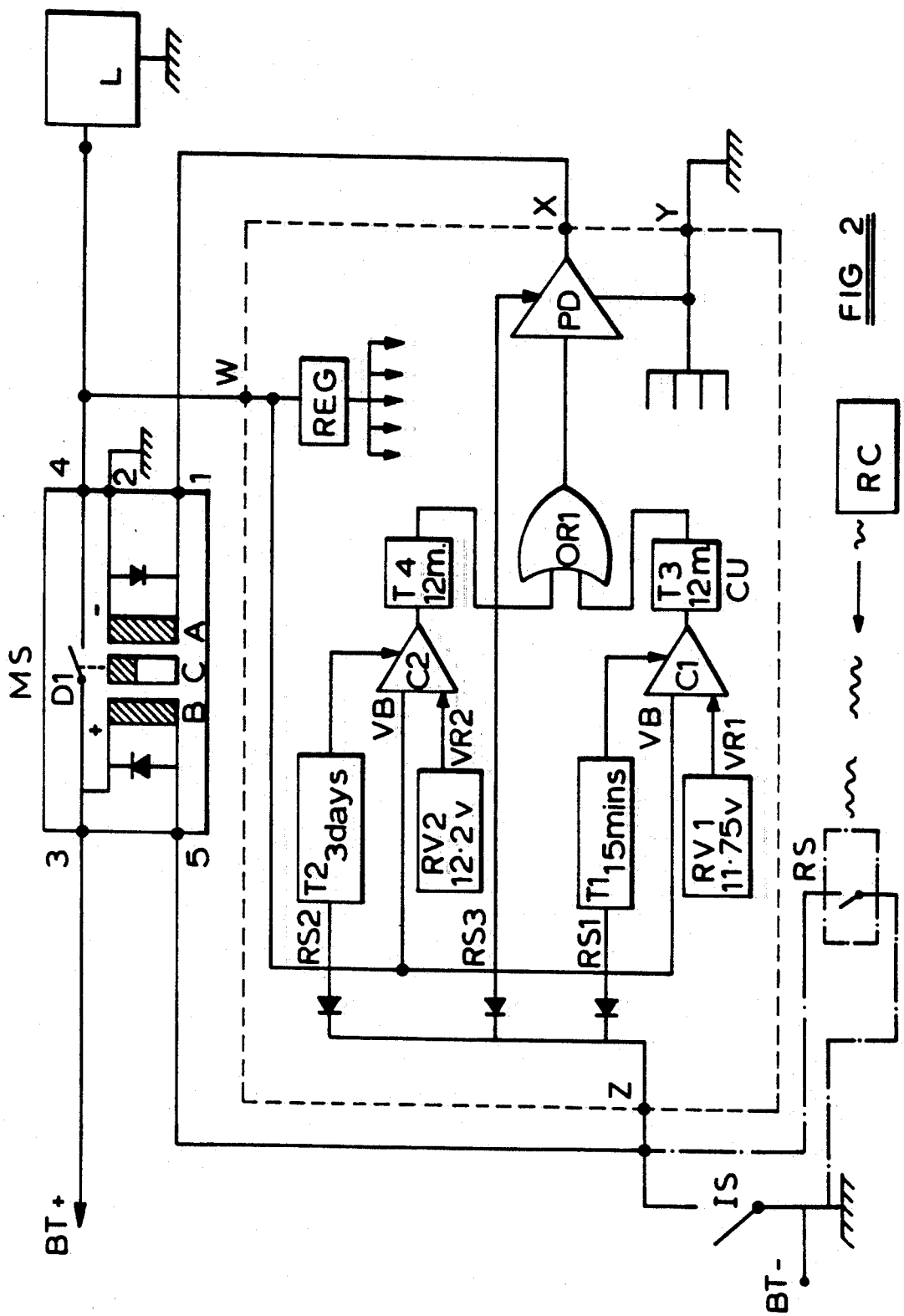
FIG. 2 is a more detailed circuit diagram of part of FIG. 1 giving further details of the electrical supply control system.

Master switch MS is controlled from a control unit CU by a signal produced at terminal X. Inputs to the control unit are actual battery voltage (subject to MS being closed) at input W and a signal at terminal Z indicative of the open or closed state of a driver operable switch means or driver controlled ignition switch IS. Further details of the control unit and other closely associated components will now be described with reference to FIG. 2. In FIG. 2, master switch MS is shown as a relay unit. An alternative would be a solid state switching device and details of a suitable device will be described subsequently.

As shown in FIG. 2, power is supplied from the battery positive terminal to load L via terminals 3 and 4 of master switch MS through normally closed contacts D1 of the master switch. The master switch is in this example constituted by a memory relay. The invention is concerned particularly with the circumstances under which contacts D1 are opened to isolate the battery positive terminal from load L. Relay MS is a memory relay in that in the absence of any current through control windings A or B, contacts D1 are latched open or closed as the case may be. Such a memory facility may be provided by a mechanical over-centre spring arrangement associated with the contacts. Alternatively, a magnetic core C of the relay may be such as to exhibit remanence to act as a permanent magnet. A control winding B of the relay is connected between its terminals 3 and 5 and terminal 5 is connected to ignition switch contacts IS, the arrangement being such that closing IS closes contacts D1. A control winding A of the relay is connected between its terminals 1 and 2 and is arranged when energised (in a manner to be described subsequently) to open contacts D1. Energisation of either winding A or B alone is sufficient to overcome the remanence of core C; energisation of winding B overrides any energisation of winding A. Thus, as a safety feature, whenever the ignition switch is closed, battery power is available to the loads which may include safety critical items such as engine controls.

Energisation of winding A of relay MS is provided from a terminal X of control unit CU. The control unit incorporates two conventional reference voltage generators RV1 and RV2. Output voltage VR1 of RV1 is typically set to 11.75 volts but possibly as low as 10.5 volts, a level at which a battery is likely to be just able to start an engine. Voltage VR2 of RV2 is typically set to 12.2 volts, a level corresponding to a low level of battery charge with a very light load on the battery.

Actual battery potential VB is provided to the control unit through the relay MS for comparison with the reference voltages VR1 and VR2. To this end, VR1 and VB are compared in a comparator C1 while VR2 and VB are compared in a comparator C2. The two comparators are normally disabled but become enabled after time delays controlled by timers T1 and T2. Timers T1 and T2 are arranged to run from the time when the ignition switch contacts IS are opened by means of control connections RS1 and RS2 connected to switch IS via terminal Z. The ignition switch is a convenient driver operable facility which is normally switched as the driver leaves or returns to the car.

Timer T1 is arranged to enable comparator C1 fifteen minutes after the ignition switch has been opened. Fifteen minutes has been selected as a reasonable time to enable the battery voltage to stabilise even in a case where a high load has been drawn from the battery immediately before the ignition is switched off. The time of operation of timer T1 is not critical and any time between five and thirty minutes might be appropriate. Comparator C1 is such as to provide a logic 1 state at its output when battery voltage VB is less than VR1. The output from C1 is connected via a timer T3 through OR-gate OR1 to a pulse driver unit PD. The purpose and effect of timer T3 will be explained subsequently. Control connection RS3 disables pulse driver PD when the ignition switch is closed. Operation of the pulse driver provides a pulse of sufficient amplitude and duration to winding A of the memory relay MS to open contacts D1.

Opening of contacts D1 breaks the connection between the battery and the load, thereby preventing further discharge of the battery through such loads. In this way, if the battery has a low level of charge or is in particularly poor condition, drainage on the battery through typical loads applied to it is prevented some minutes after the ignition has been turned off. With a battery in a very poor state, this may occur immediately the timer T1 enables comparator C1 subject to the time delay of timer T3. In other situations such as when a vehicle has been parked with lamps on, the loads such as the lamps continue to draw current until the battery voltage drops to level VR1. This may be after a number of hours or a small number of days. When in such a case the battery voltage drops to VR1, the comparator output operates the pulse driver and thereby isolates loads from the battery as before. The level of VR1 should have been selected so as to just maintain sufficient battery voltage to allow the battery to start the vehicle engine in adverse conditions such as low temperature.

Reference voltage generator RV2, timer T2, comparator C2 and timer T4 operate in a similar manner to elements RV1, T1 and C1 and T3 but with a different time scale and different reference voltage. If at any time after three days from opening the ignition switch the battery voltage falls below VR2, that is 12.2 volts, comparator C2 operates and contacts D1 are opened to isolate the load. The three day operating period of timer T2 is not critical; any period between about thirty-six hours and about four days might be suitable.

The two combinations of time delay and associated voltage level, namely T1 with VR1 and T2 with VR2 operate to protect a residual charge in the battery in different ways. For the short period, the main concern is to cut the electrical supply in the presence of a low battery and a substantial discharge rate such as might be associated with interior lights or parking lights. Loads of this nature even if left on for only a few hours can bring the battery to a very low state of charge. With a typical discharge rate leading to significant discharge in a few hours, internal resistance of the battery tends to lower its potential during the discharge. There is then a significant recovery of potential within a few minutes of disconnecting the load by opening master switch MS. Thus it is acceptable to allow a relatively low battery potential of say 11.75 volts to be reached before cutting off the supply because a recovery to perhaps 12.3 or 12.4 volts can be expected when the battery recovers.

The 15 minute duration of timer T1 guards against inadvertent and unnecessary opening of master switch MS in the following circumstances. Immediately prior to switching off the ignition and leaving the car, the engine might have been idling for some minutes while the car was subject to a very substantial electrical load. For example windscreen wipers, heated rear window and air conditioning could all be operating continuously with a low generator output associated with low engine speed so that most of this load is provided from the battery. This kind of situation results in a high internal resistance for the battery, temporarily depressing the potential of even a well charged battery below a threshold of 11.75 volts. After the ignition and with it the other heavy loads have been switched off, the battery recovers within a few minutes to a potential appropriate to its state of charge. The time delay associated with timer T1 ensures that the temporary low voltage can not produce a response in the control unit to open contacts D1.

After a longer period of time than a few hours, for example after 36 hours or the 3 days delay associated with timer T2, there is no concern about the substantial rates of discharge associated with lamps being left on. With such a discharge rate and without the control system of this invention the battery would have been flat by this time. With the present arrangement the master switch MS would have been operated to cut the discharge. Instead, concern is focused on much lower discharge rates as might be associated with quiescent current to operate clocks and memory systems and also to the normal slow self discharge of a battery. Because of these low rates of discharge, there is very little battery internal resistance and thus very little battery voltage recovery when the load is disconnected. For this reason, a higher threshold voltage for triggering disconnection of the load is appropriate and this is provided for by the higher 12.2 volts of VR2. Thus after the longer delay period of typically three days dependent on timer T2, any voltage level below 12.2 results in disconnection of the load.

Timers T3 and T4 connected respectively between the outputs of comparators C1 and C2 and the OR-gate OR1 provide a further refinement. These devices are arranged to delay the application of a 1 signal from the respective comparator to the OR-gate for a period of for example 12 minutes and then only to allow the 1 signal to reach the OR-gate if the comparator output is still in the 1 state.

Without timer T3 or T4, a driver could approach the car and switch on a peripheral load such as door operated interior lights prior to operating the ignition switch. If the battery potential is already close to the cut out level, this temporary load can be sufficient to depress the battery voltage and but for timers T3 and T4 would trigger opening of contacts D1 and disconnection of the power supply. With timers T3 and T4 in position, the driver has a 12 minute period within which to switch on the ignition and thus reset timers T1 and T2 and block the 1 signal at the output of the respective comparator before load disconnection has occurred. The 12 minute time period is selected to be sufficient in a typical case for the driver to have operated the ignition switch. Similarly, someone approaching the car, opening the door for access to the interior of the car and then again leaving the car, allows some time after the car has been left for battery recovery and thus for cancellation of the 1 state at the comparator output.

It would be possible to add further elements operating at different voltages after different time delays to give a range of times and voltages at which the load becomes isolated. However, it appears that for practical purposes the most useful safeguards are a voltage of about 11.75 immediately after the battery voltage has stabilised and a voltage of about 12.2 a few days later.

The control unit CU also incorporates its own voltage regulator REG through which power is supplied to all the elements of the logic circuitry via terminal W. Logic ground is provided at terminal Y. The arrangement is such that the control unit places no load on the battery after relay MS has operated.

When a driver operates the ignition switch after the vehicle has been standing for some time, the timers T1 and T2 and other logic elements are immediately reset so that if the control unit has not operated to isolate the loads, it will not operate while the ignition is on. If, as is normal, the ignition switch is operated before contacts D1 have been opened, the vehicle will operate normally with all electrical devices operating continuously.

As a safety precaution, continuous energisation of winding B in relay MS ensures that contacts D1 are not opened inadvertently by mechanical shock or other spurious input.

If on the other hand the contacts D1 have opened in response to a low battery voltage prior to turning on the ignition, energisation of winding B closes contacts D1 and reconnects all loads. This allows most vehicle functions to operate normally. A few vehicle functions such as memory elements and the vehicle clock would require resetting before they can operate normally. The inconvenience of such resetting is of little significance compared with the possibility of a vehicle which can not be started. The driver should be able to deduce that the electrical load has been isolated because the vehicle clock should flash and will probably indicate an entirely inappropriate time. This gives warning concerning the state of the battery and the fact that certain other functions may not operate correctly.

As an alternative to the connections RS1 and RS2 resetting and holding the timers T1 and T2 until switch IS is opened, they may allow the timers to run and other parts of the system to operate, relying on energisation of winding B to override any energisation of winding A. Then the control connections RS1, RS2 and RS3 should be such as to have a reset pulse applied on opening of switch IS.

It may be desirable to give higher priority to continued operation of some electrical devices than to safeguarding the battery. Such devices, possibly including alarms, may be arranged to by-pass the control system by being connected directly to the battery.

As an alternative to bringing the control system into operation by the ignition switch, another driver operable switch, such as one coupled to a door lock, may be substituted. Such an alternative switch may be operated directly or by a remote controller. The alternative of a remotely controlled switch RS with remote controller RC is illustrated in chain dotted outline in FIG. 2.

The system has been described as a stand alone device which could be added as a module to the complete electrical system of a vehicle. As an alternative, it could be integrated into a complete electronics package of a vehicle. In such a case components such as the reference voltage generators and voltage regulator may be common to other parts of the vehicle electronics system.

Master switch MS has been described as an electromechanical device, namely a relay. Alternatively a solid state device may be employed. For example, four field effect transistors in parallel could have sufficient current capacity to handle the required loads. These field effect transistors would have common control terminals, connected to receive signals corresponding to an "ignition on" signal from contacts IS and a "disconnect" signal from terminal X. These signals should be of opposed polarity with the "ignition on" signal capable of overriding the "disconnect" signal.

I claim:

1. A control system for the electrical supply of a motor vehicle, the motor vehicle incorporating an electrical storage battery and electrical system including at least one facility which normally consumes current when the vehicle is left unattended and driver operable switch means such that a first switching operation normally occurs when the driver leaves the vehicle and a second switching operation normally occurs when the driver returns to the vehicle; the control system comprising means for generating a first relatively low reference voltage selected to conform to a pre-selected battery condition; a first timing means operable for a relatively short period; means responsive to said first switching operation to start the first timer; first voltage comparison means arranged to compare the actual battery voltage with the first reference voltage after said relatively short period and thereafter to provide a low battery signal if the actual voltage is below the first reference voltage; means for isolating the battery from the electrical system in response to the low battery signal and means for reconnecting the battery to the electrical system in response to said second switching operation, characterised by the provision of means for generating a second relatively high reference voltage selected to conform to a different pre-selected battery condition; a second timing means operable for a relatively long period and responsive to the first switching operation to start the second timer; second voltage comparison means arranged to compare actual battery voltage with the second reference voltage after said relatively long period and thereafter to provide a low battery signal if the actual voltage is below the second reference voltage; the means for isolating the battery from the electrical system being responsive to either low battery signal.

2. A control system as claimed in claim 1 in which the driver operable switch means is an ignition switch.

3. A control system as claimed in claim 1 in which the driver operable switch means is operated by a remote controller.

4. A control system as claimed in claim 1 wherein the means for isolating the battery from the electrical system is a memory relay which remains in an open state without any electrical supply.

5. A control system as claimed in claim 4 in which the relay is such as to remain closed without any electrical supply.

6. A control system as claimed in claim 4 in which the relay is openable by and remains open in response to a finite pulse generated when low battery voltage is detected.

7. A control system as claimed in claim 5 in which closure of the driver operable switch means overrides all other influences on the relay and holds it closed.

8. A control system as claimed in claim 1 wherein the first timing means is such as to render the control system operative only after the vehicle has been left unattended for sufficient time for the battery voltage to stabilise.

9. A control system as claimed in claim 8 wherein the first reference voltage is between 11.5 volts and 11.75 volts.

10. A control system as claimed in claim 1 comprising a further timer responsive to the second voltage comparison means to permit isolating of the battery only after said comparison means indicates that the battery voltage has been below said second reference voltage for a preset time dependent on said further timer.

11. A control system for the electrical supply of a motor vehicle, the motor vehicle incorporating an electrical storage battery and electrical facilities including at least one facility which normally consumes current when the vehicle is left unattended and driver operable switch means such that a first switching operation normally occurs when the driver leaves the vehicle and a second switching operation normally occurs when the driver returns to the vehicle; the control system comprising means for generating a first relatively low reference voltage selected to conform to a pre-selected battery condition; a first timing means operable for a relatively short period; means responsive to said first switching operation to start the first timer; first voltage comparison means arranged to compare the actual battery voltage with the first reference voltage after said relatively short period and thereafter to provide a low battery signal if the actual voltage is below the first reference voltage; means for isolating the battery from the electrical system in response to the low battery signal and means for reconnecting the battery to the electrical system in response to said second switching operation, characterised by the provision of means for generating a second relatively high reference voltage selected to conform to a different pre-selected battery condition; a second timing means operable for a relatively long period and responsive to the first switching operation to start the second timer; second voltage comparison means arranged to compare actual battery voltage with the second reference voltage after said relatively long period and thereafter to provide a low battery signal if the actual voltage is below the second reference voltage; the means for isolating the battery from the electrical system being responsive to either low battery signal, and the second timing means is operable for a period of between thirty-six hours and four days.

12. A control system as claimed in claim 11 in which the second reference voltage is about 12.2 volts.

13. A control system for the electrical supply of a motor vehicle, the motor vehicle incorporating an electrical storage battery and electrical facilities including at least one facility which normally consumes current when the vehicle is left unattended and driver operable switch means such that a first switching operation normally occurs when the driver leaves the vehicle and a second switching operation normally occurs when the driver returns to the vehicle; the control system comprising means for generating a first relatively low reference voltage selected to conform to a pre-selected battery condition; a first timing means operable for a relatively short period; means responsive to said first switching operation to start the first timer; first voltage comparison means arranged to compare the actual battery voltage with the first reference voltage after said relatively short period and thereafter to provide a low battery signal if the actual voltage is below the first reference voltage; means for isolating the battery from the electrical system in response to the low battery signal and means for reconnecting the battery to the electrical system in response to said second switching operation, characterised by the provision of means for generating a second relatively high reference voltage selected to conform to a different pre-selected battery condition; a second timing means operable for a relatively long period and responsive to the first switching operation to start the second timer; second voltage comparison means arranged to compare actual battery voltage with the second reference voltage after said relatively long period and thereafter to provide a low battery signal if the actual voltage is below the second reference voltage; the means for isolating the battery from the electrical system being responsive to either low battery signal, and a third timer responsive to the first voltage comparison means to permit isolating of the battery only after said comparison means indicates that the battery voltage has been below said first reference voltage for a preset time dependent on said timer.

* * * * *